Patented Apr. 12, 1927.

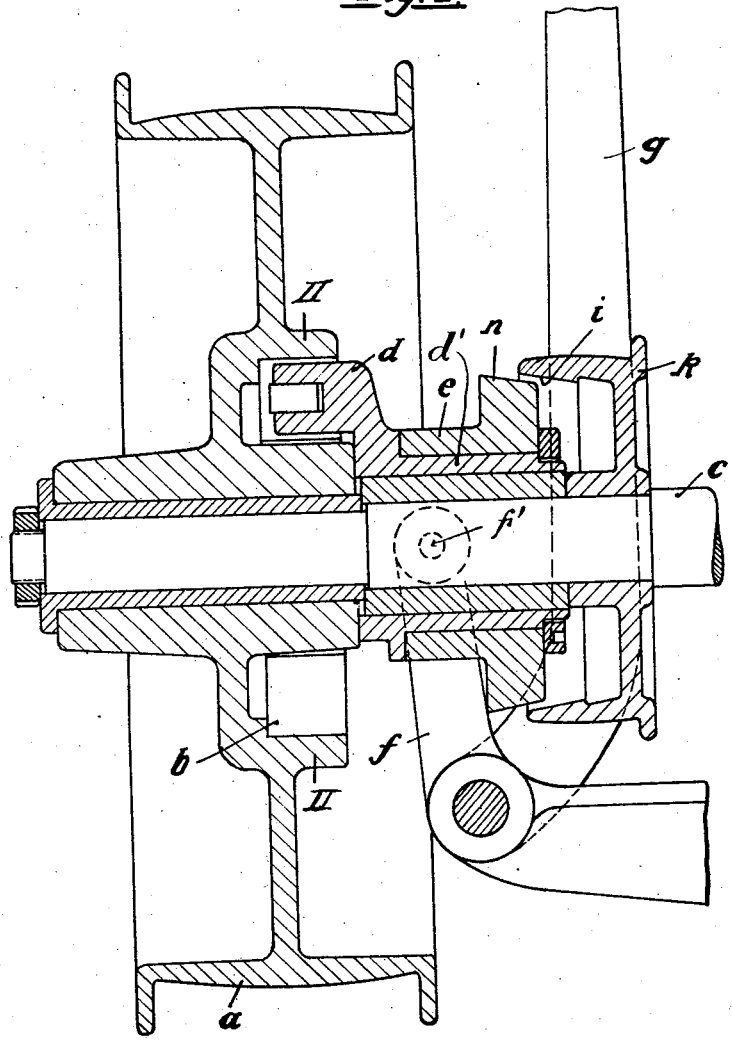

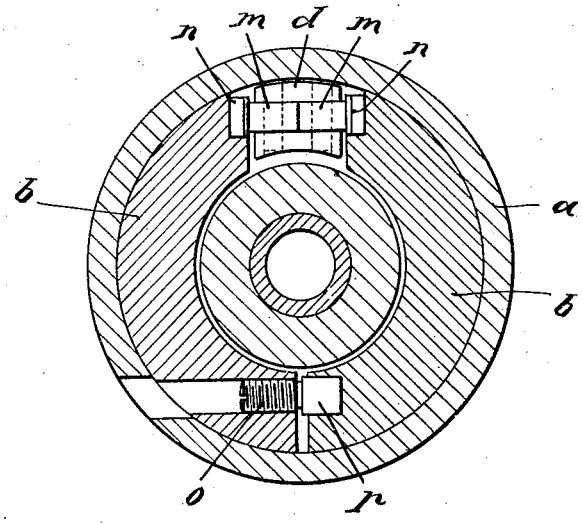
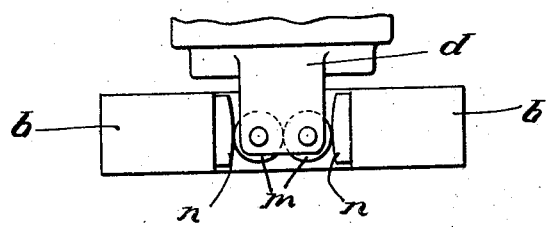

1,624,025

UNITED STATES PATENT OFFICE.

KARL TESSKY, OF ESSLINGEN-ON-THE-NECKAR, GERMANY.

CLUTCH.

Application filed June 30, 1925, Serial No. 40,651, and in Germany July 21, 1924.

My invention relates to clutches which are adapted to be thrown in and out and to be used in connection with machines or parts of machinery, the driving part of which tends to continue rotating after the clutch has been thrown out so that it is desirable to brake the driven part after disconnecting the clutch. The novel clutch is also suitable in cases where the continuously rotating or driving part of the clutch is seated on the driven shaft or the like and where in consequence of too small frictional resistance against the rotation of the driven part or of too high friction between the driving and driven parts which may be due to insufficient lubrication or the like, the driven part tends to partake in the rotation of the driving part after the clutch has been disconnected.

It is an object of my invention to overcome these drawbacks. To this end I provide an automatic brake in which automatically stops the driven part on and by the throwing-out of the clutch. In a preferred embodiment of my invention the usual annular slide which operates the clutch, at the same time forms the brake disc for the driven part.

In the drawings affixed to this specification and forming part thereof, a device embodying my invention is illustrated diagrammatically by way of example.

In the drawings—

Fig. 1 is a longitudinal section of the clutch,

Fig. 2 is a cross section on the line 2, 2 in Fig. 1, and

Fig. 3 is a detail.

Referring to the drawings, $c$ is the driven shaft, and $a$ is a continuously rotating driven part, for instance a pulley, to which rotation is imparted by a belt (not shown). A split ring $b$ is inserted in the boss of the pulley $a$, $e$ is an annular slide adapted to be displaced on the driven shaft but secured against rotation by the fork $f$. A bracket $d$ is formed on a sleeve $d'$ on which the slide $e$ is seated. The sleeve $d'$ is free to slide on the shaft but partakes in its rotation. Rollers $m$, $m$ carried by the bracket $d$ are adapted to cooperate with cam faces $n$, $n$ at adjoining ends of the split ring $b$ so that the two halves of this ring are displaced radially, when the bracket $b$ is displaced axially. A set screw $o$ in one of the parts of the split ring and an abutment $p$ in the other allows the parts to be adjusted for wear.

A conical disc $h$ formed on the outer end of the slide $e$ is adapted to cooperate with a conical recess $i$ at the inner end of a brake drum secured on the shaft $c$ and, which if desired, may have the form of a pulley. The fork $f$ is connected with the slide $e$ by pins $f'$ and a lever $g$ is secured on the fulcrum $g'$ of the fork.

In the position shown in Fig. 1, the pulley $a$ is carried along by the shaft $c$, the bracket $d$ being in its inner end position and its rollers $m$, $m$ forcing the split ring $b$, $b$ against the boss of the pulley $a$. When the lever $g$ is moved to the right, the parts of the split ring $b$ are released and at the same time the cone $h$ on slide $e$ enters the recess $i$ in drum $k$. As the slide $e$ is prevented from rotating by the fork $f$, the shaft $c$ will be stopped. I thus prevent the shaft $c$ from continuing its rotation after having been disconnected and at the same time I prevent the shaft from being rotated, by the pulley $a$ while the clutch is thrown out.

Any suitable means (not shown) may be provided, for holding the slide $e$ in its end positions, for instance a spring which can be moved out of a neutral position in opposite directions.

I wish it to be understood that I do not desire to be limited to the exact details of construction shown and described, for obvious modifications will occur to a person skilled in the art.

I claim:—

1. Clutch comprising a shaft, a driven part loose on said shaft, an annular slide secured against rotation and adapted to connect said driven part and said shaft, a brake disc on said slide and a brake drum on said shaft adapted to cooperate with said disc.

2. Clutch comprising a shaft, a driven part loose on said shaft, an annular slide secured against rotation and adapted to connect said driven part and said shaft, a brake disc on said slide and a brake drum having the form of a pulley on said shaft adapted to cooperate with said disc.

In testimony whereof I affix my signature.

KARL TESSKY.